(12) United States Patent
Lazes

(10) Patent No.: US 7,303,168 B1
(45) Date of Patent: Dec. 4, 2007

(54) AIRCRAFT SPRAYING CONVERSION KIT FOR USE IN EXTINGUISHING FIRES

(76) Inventor: Richard J. Lazes, 18301 Mandrain Point Dr., Cornelius, NC (US) 28031

( * ) Notice: Subject to any disclaimer, the term of this patent is extended or adjusted under 35 U.S.C. 154(b) by 246 days.

(21) Appl. No.: 11/065,605

(22) Filed: Feb. 25, 2005

(51) Int. Cl.
*B64D 1/00* (2006.01)

(52) U.S. Cl. ...................................... 244/136

(58) Field of Classification Search ................ 244/136, 244/137.1; 239/171; 169/52–53
See application file for complete search history.

(56) References Cited

U.S. PATENT DOCUMENTS

| | | | | |
|---|---|---|---|---|
| 3,395,880 A | * | 8/1968 | Mulquin | 244/137.3 |
| 3,547,000 A | * | 12/1970 | Haberkorn et al. | 89/1.51 |
| 3,698,480 A | * | 10/1972 | Newton | 169/43 |
| 3,901,467 A | * | 8/1975 | Hawkshaw | 244/136 |
| 4,195,693 A | * | 4/1980 | Busch et al. | 169/53 |
| 4,437,630 A | * | 3/1984 | Jefferies | 244/136 |
| 4,621,780 A | * | 11/1986 | Doyhamboure et al. | 244/118.2 |
| 5,549,259 A | * | 8/1996 | Herlik | 244/136 |
| 6,622,966 B1 | * | 9/2003 | McConnell, Sr. | 244/136 |
| 6,769,493 B1 | * | 8/2004 | Fima et al. | 169/53 |
| 2005/0017131 A1 | * | 1/2005 | Hale et al. | 244/136 |

* cited by examiner

*Primary Examiner*—Tien Dinh
(74) *Attorney, Agent, or Firm*—Adams and Reese LLP

(57) ABSTRACT

An aircraft spraying conversion kit which provides for the aerial dispensing of a fire extinguishing agent. The kit includes a dispensing manifold assembly removably coupled to an open aircraft door which is supported by a support frame having two parallel support legs which also lock the opened aircraft door in a predetermined open position while the aircraft is in flight.

7 Claims, 4 Drawing Sheets

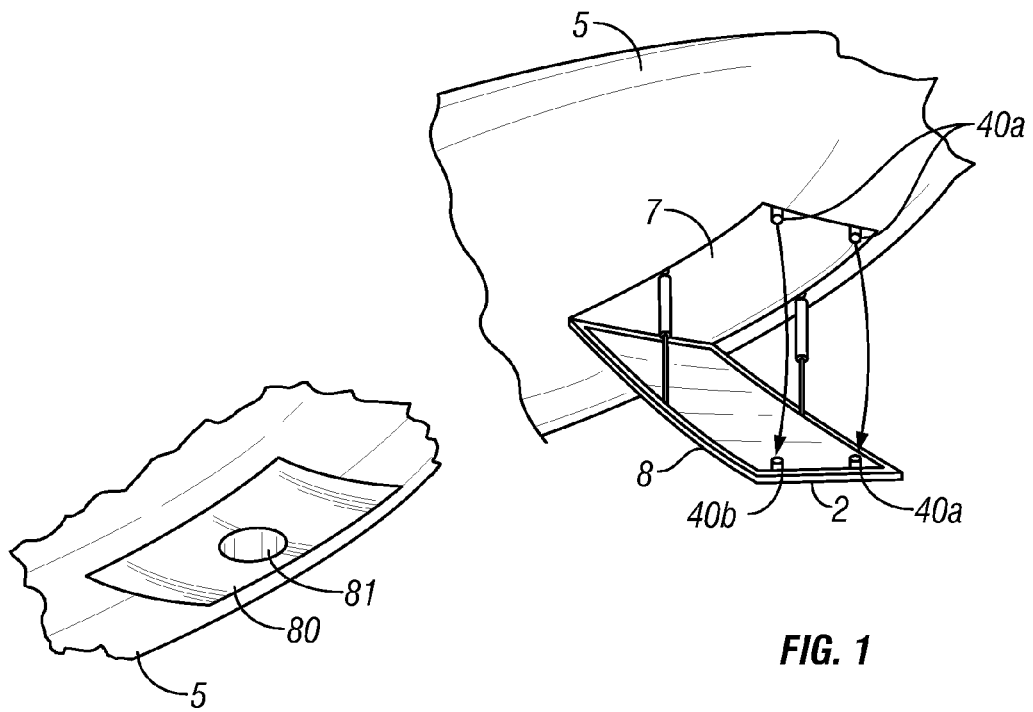
FIG. 8
FIG. 1
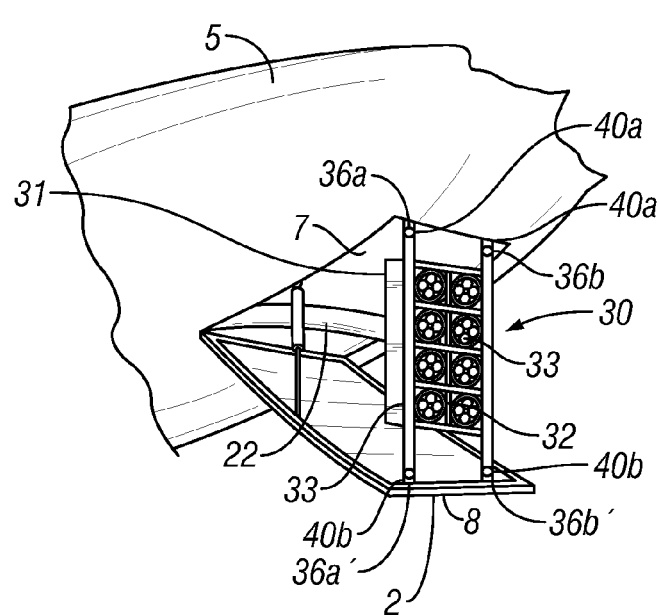
FIG. 2

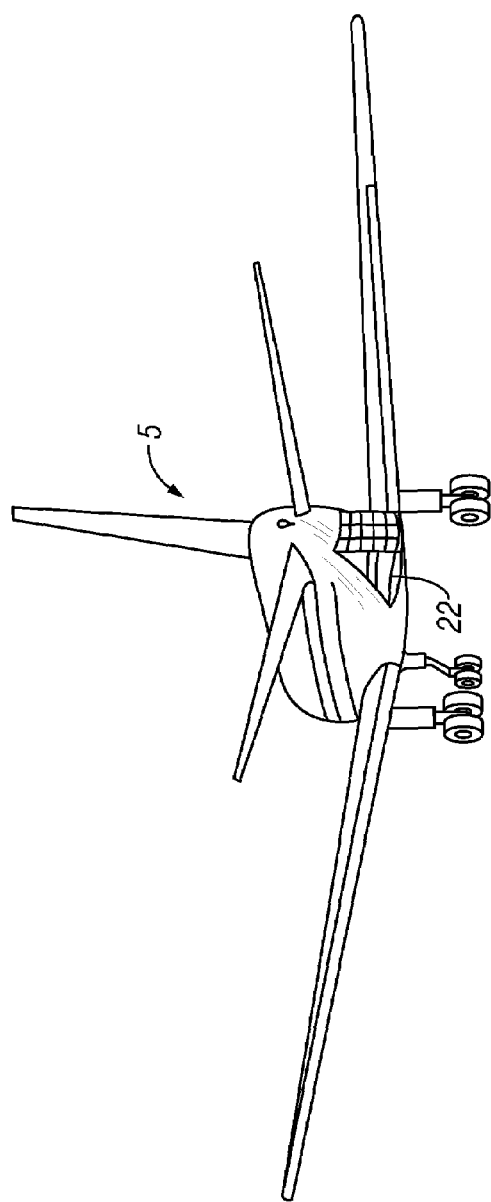

AIRCRAFT SPRAYING CONVERSION KIT FOR USE IN EXTINGUISHING FIRES

BACKGROUND OF THE INVENTION

1. Field of the Invention

The present invention relates to apparatuses for extinguishing fires, spraying insecticides and spraying dispersant chemicals to break up oil slicks via an aircraft and, more particularly, to an aircraft spraying conversion kit which includes a dispensing manifold assembly removably coupled to an open or closed aircraft door and supported by a frame having support legs which also lock the opened aircraft door in a predetermined open position while the aircraft is in flight.

2. General Background

During the summer months or during droughts heavily wooded areas are prone to fires. Recently, the state of Florida experienced wide spread fires which threatened human life and devastation of communities. California also experienced wide spread fires which have threatened human life and devastation of high priced real estate. The state of Louisiana requested voluntary ban on fireworks last summer because of the lack of rainfall leaving the foliage and wooded areas very dry and susceptible to fires. One of the biggest problems with wildfires is the inability to rapidly extinguish fires in the woods because of the lack of access or absence of roads into such wooded area. Thereby, the use of fire trucks equipped with water and/or chemicals deep into flaming wooded areas have proven to be futile in most cases. As a result, the use of aircraft to expel chemicals and/or water from high in the sky has been attempted with some success.

Several apparatuses have been patented which are aimed at aerial dispensing of chemicals or fire extinguishing agents via an aircraft.

U.S. Pat. No. 4,437,630, issued to Jefferies, entitled "SPRAY BOOM APPARATUS FOR APPLYING CHEMICAL DISPERSANTS TO OCEAN OIL SPILLS" discloses a self-contained spraying boom apparatus which is permitted to be extended from the cargo hold of a transport plane to a position outside of the plane's fuselage.

U.S. Pat. No. 4,195,693, issued to Busch et al., entitled "DEVICE FOR EXTINGUISHING FIRES FROM THE AIR" discloses a fire-extinguishing device which includes an inclined baffled tank in the fuselage adjacent and at a higher level than rearwardly opening door. The discharge pipe is swingably connected to the rear end of the tank. A valve in the discharge pipe is opened automatically when the door is opened.

U.S. Pat. No. 4,172,499, issued to Richardson et al, entitled "POWDER AND WATER MIXING AND DROPPING SYSTEM ONBOARD AN AIRCRAFT" discloses a powder and water mixing system which allows water from a body of water, such as a lake or river, to be scooped via scoops mounted on the bottom of the fuselage as the aircraft travels over the body of water. The water is mixed with a fire retardant powder in the aircraft.

U.S. Pat. No. 3,603,506, issued to Hubbs, entitled "UNIVERSAL CHEMICAL DELIVERY SYSTEM" discloses a system for dispensing chemicals from an airplane while in flight. The chemicals are stored in a collapsible or deflateable storage means removably positioned within the load space of the airplane. A spray nozzle assembly is detachably affixed to the wing or tail of the airplane for distributing the chemicals.

U.S. Pat. No. 3,484,062, issued to Johnson, entitled "AERIAL DISPENSING APPARATUS" discloses an aerial crop dusting apparatus which includes a plurality of spaced ejector tubes extending along the wings of the plane for dispensing metered powder or granular material from a feed hopper or bin in the fuselage.

U.S. Pat. No. 2,493,017, issued to Nutter, entitled "GRID SPRAY NOZZLE" discloses a grid spray nozzle including a fluid manifold having a plurality of spray nozzle conduits or tube extending in parallel relation from the fluid manifold. The grid spray nozzle is attached to the underside of the fuselage.

U.S. Pat. No. 2,426,771, issued to Harp, entitled "AIRPLANE MOUNTED FIRE EXTINGUISHING APPARATUS" discloses an apparatus including tanks stored in the fuselage and a plurality of spaced nozzles coupled along the under face of the wings.

German Patent No. 477164 issued to Hugo Junkers discloses an aircraft for spraying fluids having a tank with a pressurized canister housed within the cargo hold of the fuselage.

Italian Patent No. 688732 issued to Dita Colantoni E Co. of Rome, discloses, an aircraft for spraying fluids having a tank housed within the cargo hold formed by the fuselage by valve members to conduits which pass through the wall of the fuselage and dispense the liquid through spray nozzles.

Another patent related to aerial dispensing includes U.S. Pat. No. 5,148,989, to issued to Skinner, entitled "INSECT DISPENSING APPARATUS AND METHOD" which does not meet the needs of the present invention.

As can be readily seen, there is a continuing need for an aircraft spraying conversion kit which includes a dispensing manifold assembly removably coupled to an open or closed aircraft door and supported by a support frame which can also lock the opened aircraft door in a predetermined open position while the aircraft is in flight.

SUMMARY OF THE PRESENT INVENTION

The preferred embodiment of the aircraft spraying conversion kit of the present invention solves the aforementioned problems in a straight forward and simple manner. What is provided is an aircraft spraying conversion kit which includes a dispensing manifold assembly removably coupled to an open aircraft door and supported by a support frame having support legs which also locks the opened aircraft door in a predetermined open position while the aircraft is in flight. Thereby, the structural integrity of the opened door during the flight of the aircraft is not compromised and is not free to move and/or uncontrollably flap.

Broadly, the aircraft fluid dispensing conversion kit comprises: a reservoir for storing therein a water of liquid fire extinguishing oil dispersing agent or herbicides; a dispensing conduit coupled to said reservoir; a dispensing manifold assembly coupled to said dispensing conduit. The dispensing manifold assembly comprises: an inlet port coupled to said dispensing conduit for receiving said liquids; at least one outlet orifice in fluid communication with said inlet port and which dispenses therefrom said liquid.

In view of the above, it is an object of the present invention to provide an aircraft conversion kit fluid dispensing conversion kit which is adapted for installation on most aircrafts such as cargo type aircrafts. Thereby, the need to maintain an aircraft specifically designated for fire extinguishing oil dispersant or herbicide spraying operations is eliminated.

Another object of the invention is to provide an aircraft spraying conversion kit which allows the aircraft to be quickly reconverted into a passenger or cargo carrying aircraft.

A further object of the present invention is to provide such a dispensing manifold assembly with a support frame which affixes the at least one outlet orifice of the dispensing manifold assembly in the opening provided by an open aircraft door so that the aircraft fuselage or body is not permanently altered.

It is a still further object of the present invention to provide an aircraft spraying conversion kit with a dispensing manifold assembly having a support frame which is provided with components for the rapid installation and removal of the dispensing manifold assembly from the aircraft.

It is a still further object of the present invention to provide an aircraft spraying conversion kit which provides for the direct application of a fire extinguishing agent over a large area of a wildfire as the aircraft travels over such wildfire.

In view of the above objects, it is a feature of the present invention to provide an aircraft spraying conversion kit which is relatively simple to install.

Another feature of the present invention is to provide an aircraft spraying conversion kit which is relatively simple structurally and thus simple to manufacture.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 1 illustrates a partial end view of an aircraft having a door in an opened position and equipped with a pair of upper male members and a pair of lower female receptacles of the present invention;

FIG. 2 illustrates a rear end view of the dispensing manifold assembly of the present invention installed in the aircraft of FIG. 1;

FIG. 3 illustrates an end view of the aircraft in flight having dispensing manifold assembly of FIG. 2 installed;

FIG. 4 illustrates a side view of the aircraft spraying conversion kit installed in the stairwell door of an aircraft;

DETAILED DESCRIPTION OF THE PREFERRED EMBODIMENT

Figure 5:
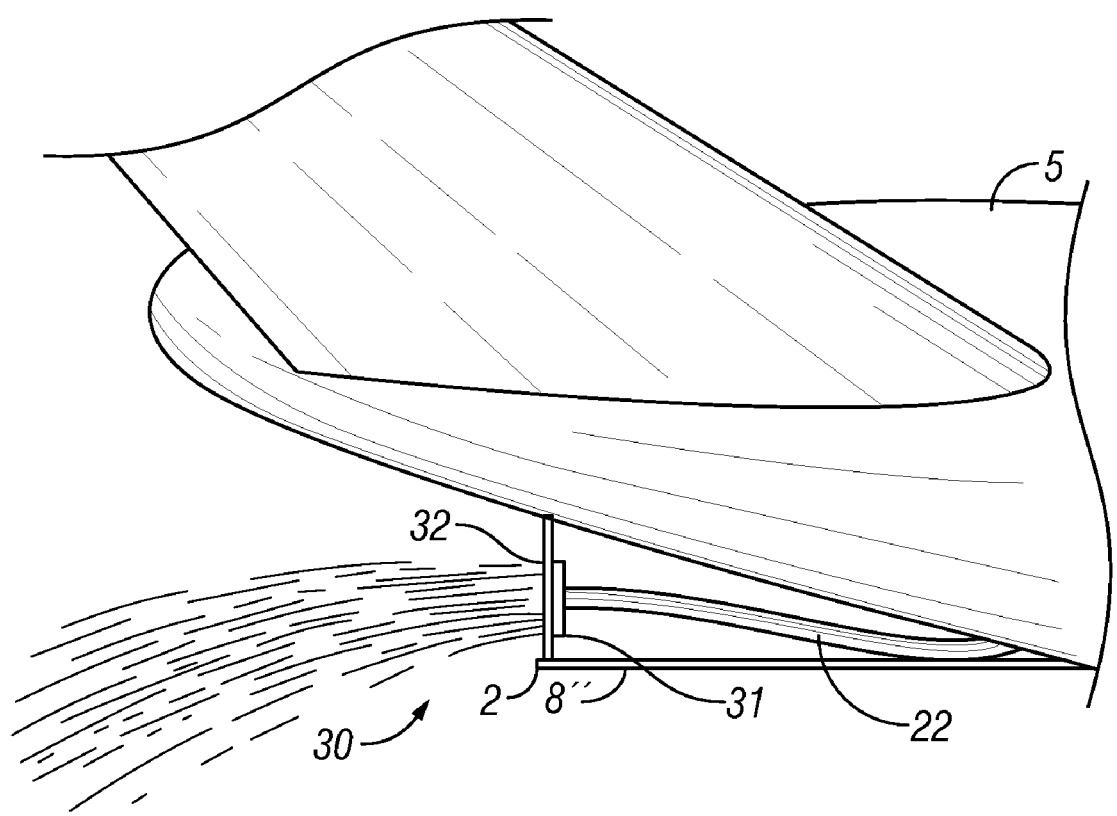
FIG. 5 illustrates a side view of the dispensing manifold assembly of FIG. 2 coupled to a cargo aircraft door.

Referring now to the drawing, and in particular FIG. 4, the aircraft spraying conversion kit 10 is generally designated by the reference numeral 10. Aircraft spraying conversion kit 10 is generally comprised of fire extinguishing agent dispensing assembly 20, dispensing manifold assembly 30 and aircraft upper male and lower female quick disconnect coupling components 40a and 40b.

The fire extinguishing agent dispensing assembly 20 includes reservoir or tank 21 for storing therein a fire extinguishing agent, dispensing conduit 22 coupled to reservoir 21, pump 23 and flow control means 24 such as a valve. The cargo compartment of aircraft 5 within the fuselage 6 houses therein reservoir or tank 21 which stores therein a fire extinguishing agent. For example the fire extinguishing agent may include water, a dry chemical or other chemical composition which is designed to extinguish a fire.

Reservoir or tank 21 is a flexible, collapsible storage tank. Thereby, the size of reservoir or tank 21 is not limited in cross section to opening 7 in the aircraft fuselage 6 for aircraft door 8, stairwell door 8' or cargo door 8" of FIGS. 1, 4 and 5.

Aircraft door 8, stairwell door 8' and cargo door 8" each have one end hingedly coupled to pivot from a closed positioned to an open positioned wherein in the open position, end 2 (hereinafter sometimes referred to as the lowered end 2) of doors 8, 8' and 8" is lowered away from fuselage 6.

Referring also to FIGS. 2 and 3, dispensing manifold assembly 30, having coupled thereto a free end of dispensing conduit 22, receives and dispenses the fire extinguishing agent flowing through the dispensing conduit 22 under the control of flow control means 24 in combination with the pumping action of pump 23.

Dispensing manifold assembly 30 comprises panel 31 having an inlet port for coupling thereto the free end of dispensing conduit 22 and front panel 32 having formed therein a plurality of outlet orifices 33. The fire extinguishing agent flowing through dispensing conduit 22 is divided into a plurality of spray streams wherein each spray stream terminates at a respective outlet orifice of the plurality of outlet orifices 33. Thereby, as the fire extinguishing agent is dispensed, the plurality of outlet orifices 33 sprays such fire extinguishing agent directly over a large area of a wildfire as aircraft 5 travels over such wildfire.

Dispensing manifold assembly 30 further comprises support frame 35 having two parallel support legs 35a and 35b each having one end 36a and 36b, respectively, removably coupled the structure defining opening 7 and the other end 36a' and 36b', respectively, removably coupled to and edge of lowered end 2 of doors 8, 8' and 8" in the open position. The two parallel support legs 35a and 35b have a predetermined length and serve to lock doors 8, 8' and 8" in an open position when secured in place. Thereby, the structural integrity of the opened doors during the flight of the aircraft is not compromised and is not free to move and/or uncontrollably flap.

A first pair of female receptacles 40b are affixed in close proximity to the edge of lowered end 2 of doors 8, 8' and 8". Additionally, a first pair of male members 40a are affixed to the structure defining opening 7. When doors 8, 8' or 8" are closed a respective one of the female receptacles 40b receive and secures therein a respective one of the male members 40a.

Aircraft upper male quick disconnect coupling components are defined by the first pair of male members 40a. Aircraft lower female quick disconnect coupling components are defined by the first pair of female receptacles 40b. Each of the male members 40a includes post member 41 which is received in a respective female receptacle 40b and is snappably locked in the female receptacle 40b via the engagement of resilient projection member 42 radially projecting from post member 41 locked in locking aperture 43 of female receptacles 40b.

Likewise, one end 36a and 36b of legs 35a and 35b, respectively, include a female receptacles 45a and 45b, respectively, which define a second pair of female receptacles. Furthermore the other end 36a' and 36b' of legs 35a and 35b, respectively, include a male members 46a and 4b, respectively, which define a second pair of male members. During installation of dispensing manifold assembly 30, the first pair of male members 40a are snappably unlocked from the female receptacles 40b so that the door can be opened to an open position. Thereafter, the first pair of male members 40a can then be snappably locked in the second pair of female receptacles 45a and 45b. Likewise, the second pair of male members 46a and 46b can be snappably locked in the first pair of female receptacles 40b. Since the first pair of male members 40a and the first pair of female receptacles are essentially the same no further description of male members 46a and 46b and female receptacles 45a and 45b will be provided.

Figures 6, 7:
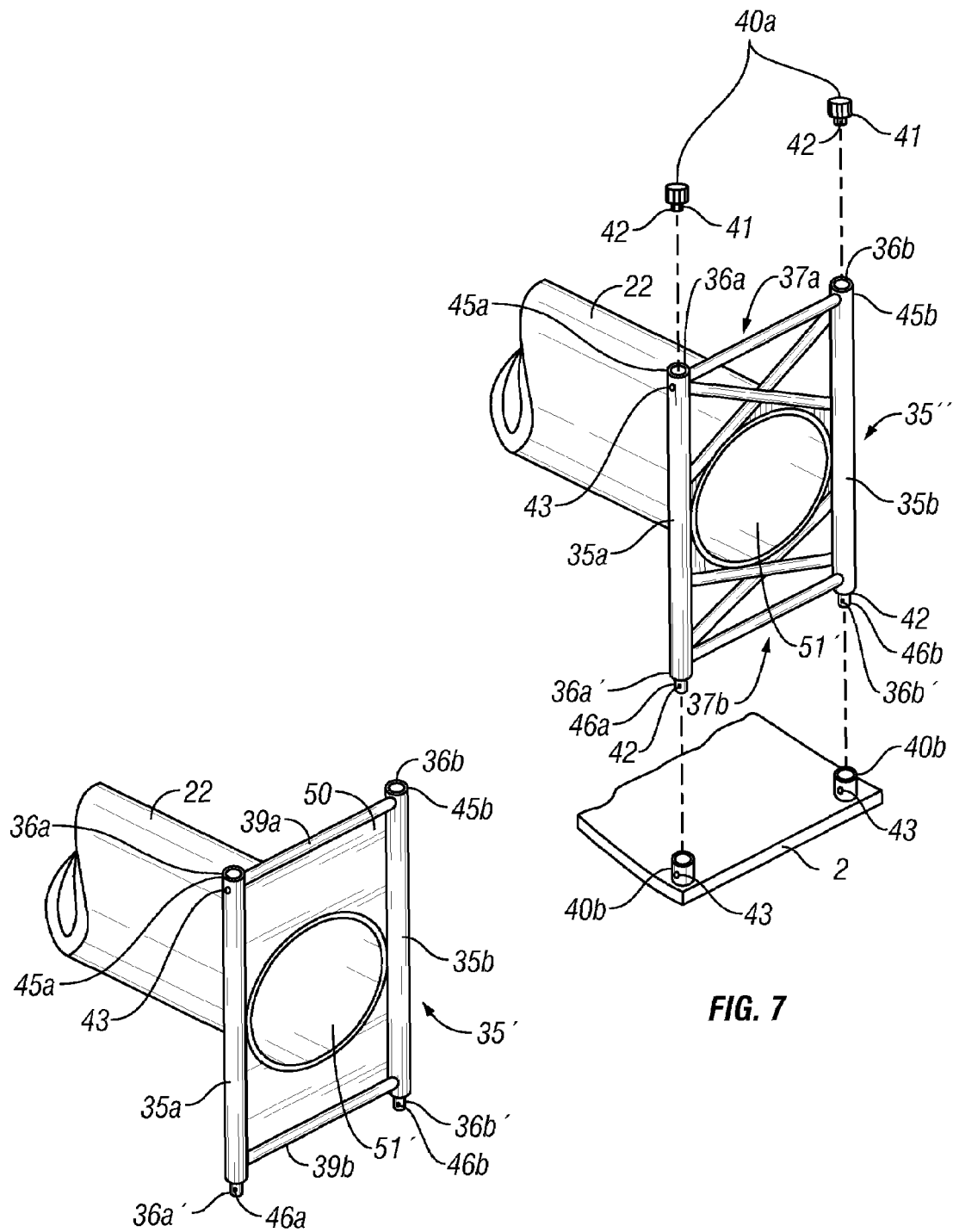
FIG. 6 illustrates a perspective view of the dispensing manifold assembly of a first alternate embodiment.
FIG. 7 illustrates a perspective view of the dispensing manifold assembly of a second alternate embodiment; and, FIG. 8 illustrates a third alternate embodiment of the present invention incorporating a outlet orifice in a removable aircraft door.

Referring now to FIG. 6, a first alternate embodiment of the dispensing manifold assembly is shown. Dispensing manifold assembly 30' comprises support frame 35' having two parallel support legs 35a and 35b each having one end 36a and 36b, respectively, removably coupled to the structure defining opening 7 and the other end 36a' and 36b', respectively, removably coupled to lowered end 2 of doors 8, 8' and 8" in the open position.

Support frame 35' further comprises top cross bar 39a coupled to the top portion of the two parallel support legs 35a and 35b and lower cross bar 39b coupled to a lower portion of the two parallel support legs 35a and 35b. Support frame 35' also includes baffle 50 coupled to top and lower cross bars 39a and 39b and the two parallel support legs 35a and 35b to form a unitary structure. Baffle 50 has formed essentially in the center thereof outlet orifice 51 for dispensing the fire extinguishing agent. The interior side of outlet orifice 51 serves as the inlet port for coupling thereto dispensing conduit 22. The exterior side of outlet orifice 51 dispenses therefrom the fire extinguishing is agent.

Although only a single outlet orifice 51 having a relatively large diameter is shown, outlet orifice 51 may be substituted with a plurality of outlet orifices to dispense streams of the fire extinguishing agent.

Referring now to FIG. 7, a second alternate embodiment of the dispensing manifold assembly is shown. Dispensing manifold assembly 30" comprises support frame 35" having two parallel support legs 35a and 35b each having one end 36a and 36b, respectively, removably coupled to the structure defining opening 7 and the other end 36a and 36b, respectively, removably coupled to lowered end 2 of doors 8, 8' and 8" in the open position.

Support frame 35" further comprises upper truss lattice 37a coupled to an upper portion of the two parallel support legs 35a and 35b and lower truss lattice 37b coupled to a lower portion of the two parallel support legs 35a and 35b and a single outlet orifice 51'. The interior side of outlet orifice 51' serves as the inlet port for coupling thereto dispensing conduit 22. The exterior side of outlet orifice 51 dispenses therefrom the fire extinguishing agent.

Nevertheless, in lieu of a single outlet orifice 51', a plurality of outlet orifices to output streams of fire extinguishing agent may be substituted.

Referring now to FIG. 8, aircraft door would be replaced with aircraft door 80 having outlet orifice 81 wherein the interior side of outlet orifice 81 is couplable to dispensing conduit 22. (FIG. 2) Thereby, when door 80 is in a closed position the fire extinguishing, oil dispersement chemicals, or herbicides or insecticides agent may be dispensed through outlet orifice 81.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An aircraft liquid dispensing conversion kit adaptable to an aircraft door, comprising:
   (a) a collapsible reservoir positioned within an aircraft;
   (b) a dispensing manifold directly coupled to an aircraft door when said aircraft door is in an open position, wherein said dispensing manifold includes at least one outlet orifice;
   (c) a dispensing conduit having a first end fluidically coupled to said dispensing manifold, and a second end fluidically coupled to said reservoir.

2. The aircraft liquid dispensing conversion kit of claim 1, wherein said dispensing manifold includes a plurality of said outlet orifices.

3. The aircraft liquid dispensing conversion kit of claim 1, wherein said dispensing manifold comprises a support frame, wherein said support frame is coupled between said aircraft door and said aircraft in a manner such that said aircraft door is locked into an open position.

4. The aircraft liquid dispensing conversion kit of claim 1, further comprising:
   (a) a pump fluidically coupled to said dispensing conduit; and
   (b) at least one flow control device positioned between said pump and said dispensing manifold, wherein said flow control device is adapted to control the flow of said liquid through said dispensing conduit.

5. The aircraft liquid dispensing conversion kit of claim 1, further comprising:
   (a) a pump fluidically coupled to said dispensing conduit; and
   (b) at least one flow control device positioned between said pump and said reservoir, wherein said flow control device is adapted to control the flow of said liquid through said dispensing conduit.

6. The aircraft liquid dispensing conversion kit of claim 1, wherein said dispensing manifold includes quick disconnect couplings adapted to connect to said aircraft door.

7. The aircraft liquid dispensing conversion kit of claim 1, wherein said reservoir, when in a collapsed state, is sized to fit through said aircraft door.

* * * * *